(12) United States Patent
Alisafaee

(10) Patent No.: US 10,753,562 B1
(45) Date of Patent: Aug. 25, 2020

(54) LIGHTGUIDE HEADLAMP

(71) Applicant: Hossein Alisafaee, Terre Haute, IN (US)

(72) Inventor: Hossein Alisafaee, Terre Haute, IN (US)

( * ) Notice: Subject to any disclaimer, the term of this patent is extended or adjusted under 35 U.S.C. 154(b) by 0 days.

(21) Appl. No.: 16/435,535

(22) Filed: Jun. 9, 2019

(51) Int. Cl.
| | |
|---|---|
| *F21S 41/24* | (2018.01) |
| *F21S 41/43* | (2018.01) |
| *F21S 41/141* | (2018.01) |
| *B60Q 1/04* | (2006.01) |
| *F21S 41/32* | (2018.01) |
| *F21S 41/25* | (2018.01) |
| *F21S 41/20* | (2018.01) |
| *F21S 41/36* | (2018.01) |
| *F21Y 115/10* | (2016.01) |

(52) U.S. Cl.
CPC .............. *F21S 41/141* (2018.01); *B60Q 1/04* (2013.01); *F21S 41/24* (2018.01); *F21S 41/25* (2018.01); *F21S 41/285* (2018.01); *F21S 41/323* (2018.01); *F21S 41/36* (2018.01); *F21Y 2115/10* (2016.08)

(58) Field of Classification Search
CPC ........ F21S 41/141; F21S 41/24; F21S 41/323; F21S 41/25; F21S 41/36; F21S 41/285; B60Q 1/04
See application file for complete search history.

(56) References Cited

U.S. PATENT DOCUMENTS

| | | | |
|---|---|---|---|
| 7,207,705 B2 * | 4/2007 | Ishida | F21S 41/323 362/517 |
| 9,250,378 B2 * | 2/2016 | de Lamberterie | G02B 6/0035 |
| 9,447,939 B2 * | 9/2016 | Wintzer | F21S 41/265 |
| 9,822,947 B2 * | 11/2017 | Owada | F21V 7/0091 |
| 10,107,466 B2 * | 10/2018 | Fedosik | F21S 41/151 |
| 10,139,646 B2 * | 11/2018 | Gromfeld | G02B 27/30 |
| 10,161,592 B2 | 12/2018 | Laminette et al. | |
| 10,352,523 B2 * | 7/2019 | Nishimura | F21S 41/40 |
| 10,451,237 B1 * | 10/2019 | Zorn | F21S 41/285 |
| 2017/0336042 A1 * | 11/2017 | Laminette | B60Q 1/14 |
| 2019/0086050 A1 * | 3/2019 | Dikau | F21S 41/143 |

* cited by examiner

*Primary Examiner* — Arman B Fallahkhair

(57) ABSTRACT

An automotive headlamp that utilizes a lightguide to form light into a desired output shape and illumination pattern. The headlamp is comprised of a light emitting source, and a lightguide. The lightguide is able to create a hot spot, and a horizontal cut-off in the illumination pattern. The cut-off is formed at the exit face of the lightguide. A cut-off facet angled from the exit-face of the lightguide is used to help with obtaining a sharp cut-off.

10 Claims, 5 Drawing Sheets

LIGHTGUIDE HEADLAMP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

PRIOR DISCLOSURES

The following reference qualifies under 35 USC 102(b) and shall be disqualified as prior art to the claimed invention. The disclosure of the reference was made by the inventor and the joint inventor: "Brand, A. C. and Alisafaee, H., 2018, September. Design and prototyping of a freeform light-guide for automotive lighting. In Current Developments in Lens Design and Optical Engineering XIX (Vol. 10745, p. 1074509). International Society for Optics and Photonics."

TECHNICAL FIELD

The present disclosure relates to the field of lighting. More specifically the disclosure is related to the lighting devices adapted for transportation.

BACKGROUND ART

Lighting devices for transportation include automotive lamps, such as headlamps, that may comprise of light-emitting diodes as the source of illumination. The headlamps generally are used for driving and passing, which also refer to high beam and low beam of the vehicle. The source of illumination generates light which later is shaped properly for road illumination according to federal or government rules and regulations.

For low beams (passing beams), the rules and regulations generally define a cut-off of the illumination pattern at a certain vertical level. This cut-off helps to avoid glare for other drivers. There are various methods to create a cut-off depending on the type of the lamp and the light source used. For example, an intermediary baffle or shield may be used to create such a cut-off for low beam by blocking the passage of light.

The conventional methods of shaping illumination patterns for automotive lighting involve the use of elliptical or concave reflectors. It is known that these modules require complex and multi-step manufacturing processes. To emit sufficient light along the optical axis of the illumination pattern, elliptical reflectors must capture a majority of emitted light. To achieve this, reflectors must be considerably larger than the horizontally oriented source. A complex manufacturing process is used to mold the reflectors out of plastic material and then coat them with reflective materials such as aluminum.

A more recent method of shaping the illumination pattern comprises of using lightguides as a method of optical beam re-orienting. One example of such method is disclosed in U.S. Pat. No. 7,207,705 B2, where a lightguide is used along with multiple reflection surfaces to reorient the beam along the front optical axis. There are also headlamp designs based on lightguides with a method of cut-off formation. For example, a disclosure in U.S. Pat. No. 10,161,592 B2 implements a cut-off mechanism in which the cut-off pattern is controlled by horizontal edge faces within the body of the lightguide. The drawback of this design is that in order to generate a clear cut-off line, multiple modules must be used. In addition, the use of multiple modules contributes to processing time spent aligning the parts, as well as tighter tolerances for placing such elements, a larger size of overall component, and an increased risk for malfunction.

What is desirable is a single lightguide that forms the beam pattern using total internal reflections as well as forming the cut-off in a simpler way in order to avoid having multiple lightguides in a headlamp assembly or intermediary baffles.

BRIEF SUMMARY OF ONE EMBODIMENT OF THE DISCLOSURE

The various embodiments of the present disclosure may, but do not necessarily, achieve one or more of the following goals: a primary object of the present disclosure is to provide a lightguide for headlamp applications in vehicles that will overcome the shortcomings of the prior art; another object is to provide an automotive lightguide that generates a sharp cut-off pattern using features of the lightguide with the use of only one module; another object of the present disclosure is to provide an automotive lightguide for formation of low beam from headlamps.

These and other advantages may be realized by reference to the remaining portions of the specification, claims, and abstract.

The present disclosure is a headlamp system for vehicles. One embodiment of the system comprises at least a light source, and a lightguide. The lightguide is optically coupled to the light source and is configured to output an illumination pattern. The illumination pattern complies with regulatory requirements for low beam.

The above description sets forth, rather broadly, a summary of one embodiment of the present disclosure so that the detailed description that follows may be better understood and contributions of the present disclosure to the art may be better appreciated. Some of the embodiments of the present disclosure may not include all of the features or characteristics listed in the above summary. There are, of course, additional features of the disclosure that will be described below and will form the subject matter of claims. In this respect, before explaining at least one embodiment of the disclosure in detail, it is to be understood that the disclosure is not limited in its application to the details of the construction and to the arrangement of the components set forth in the following description or as illustrated in the drawings. The disclosure is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which reference characters designate the same or similar parts throughout the several views, and wherein.

DETAILED DESCRIPTION OF AN EMBODIMENT OF THE PRESENT DISCLOSURE

Figure 1:
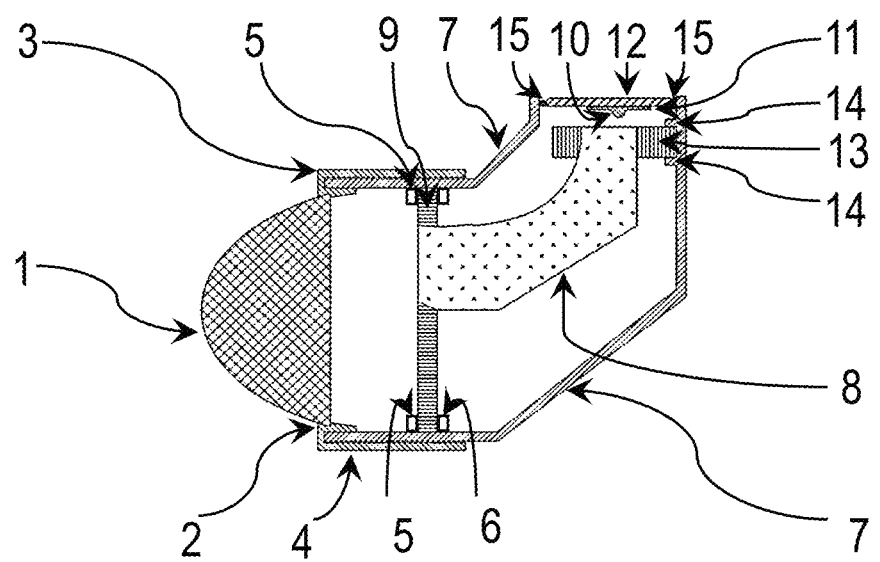
FIG. 1 is substantially a sectional view of one embodiment of the present disclosure.

In the following detailed description of embodiments of the present disclosure, reference is made to the accompanying drawings, which form a part of this application. The drawings show, by way of illustration, specific embodiments in which the disclosure may be practiced. It is to be understood that other embodiments may be utilized and structural changes may be made without departing from the scope of the present disclosure.

A. Overview

In describing the drawings, similar reference characters denote similar elements throughout several views. FIGS. 1 through 5 illustrate a lighting system.

FIG. 1 shows a lighting system which comprises of projection optics 1, light emitting source 10, a housing 7, a lightguide 8, a heatsink 12, and retaining elements. The lightguide 8 may be secured in a preferable location by retaining means. For example, several retaining elements 5, 6, 9, 13, 14 are shown in FIG. 1, and other assembly components such as screws, clips, connectors, and protective elements may be included.

The lightguide 8 is preferably positioned in relation to projection optics 1 substantially by one focal length of the projection optics 1 away, however, other configurations are possible such as the lightguide 8 and the projection optics 1 being combined into one continuous module.

B. Lightguide

Figure 2:
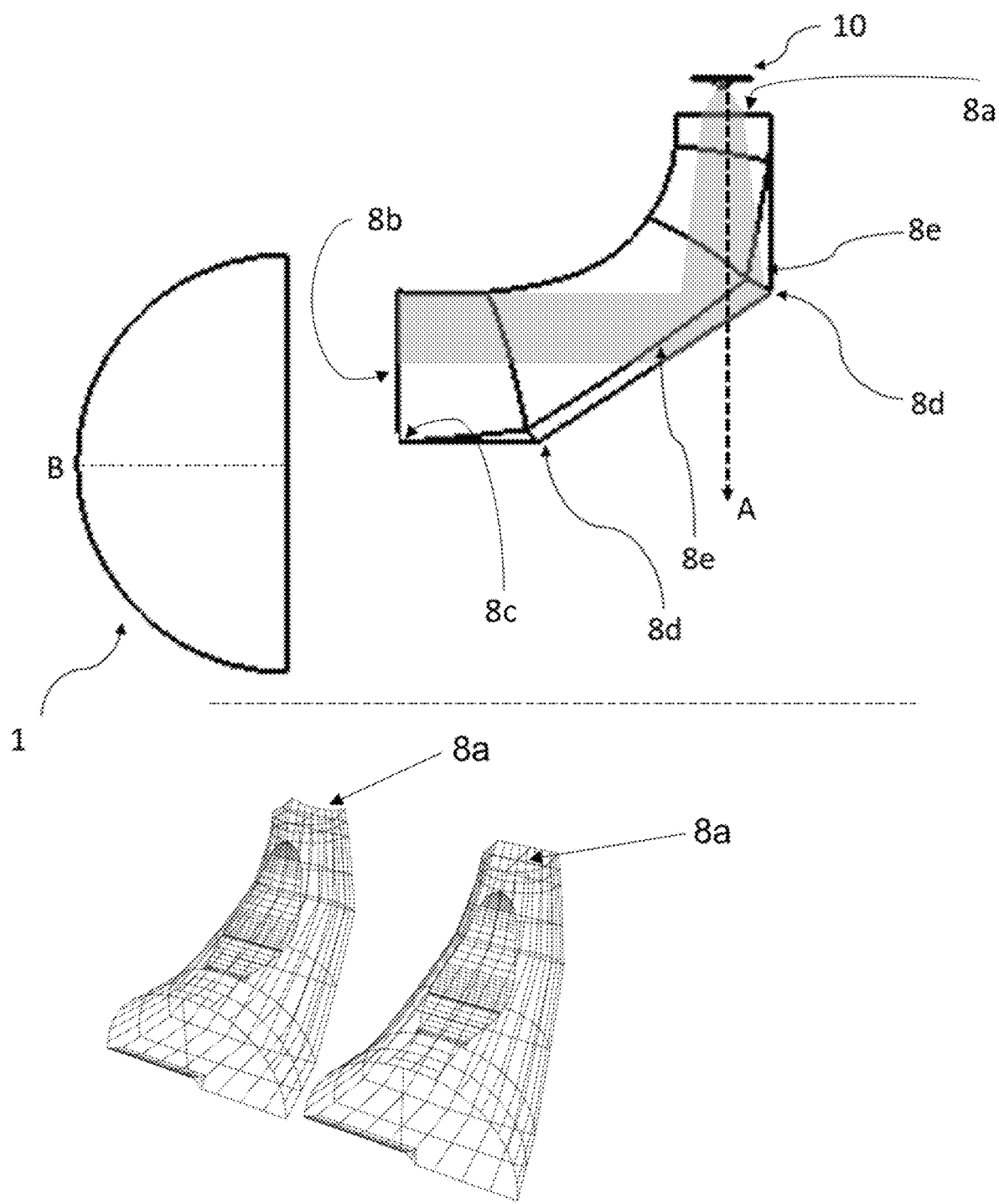
FIG. 2 is substantially a front view of the lightguide with a sample ray path.

FIG. 2 shows the lightguide 8. The lightguide 8 is comprised of an entrance face 8a, exit face 8b, and cut-off mechanism 8c. The lightguide is preferably configured to re-orient light rays from an angled axis A to optical axis B using total internal reflection surfaces oriented along a characteristic bend 8d. The lightguide 8 is preferably made out of clear plastic materials such as PMMA, Polycarbonate or the like; however other clear materials may be utilized in construction of the lightguide 8 such as but not limited to any rigid or non-rigid transparent material.

Figure 3:
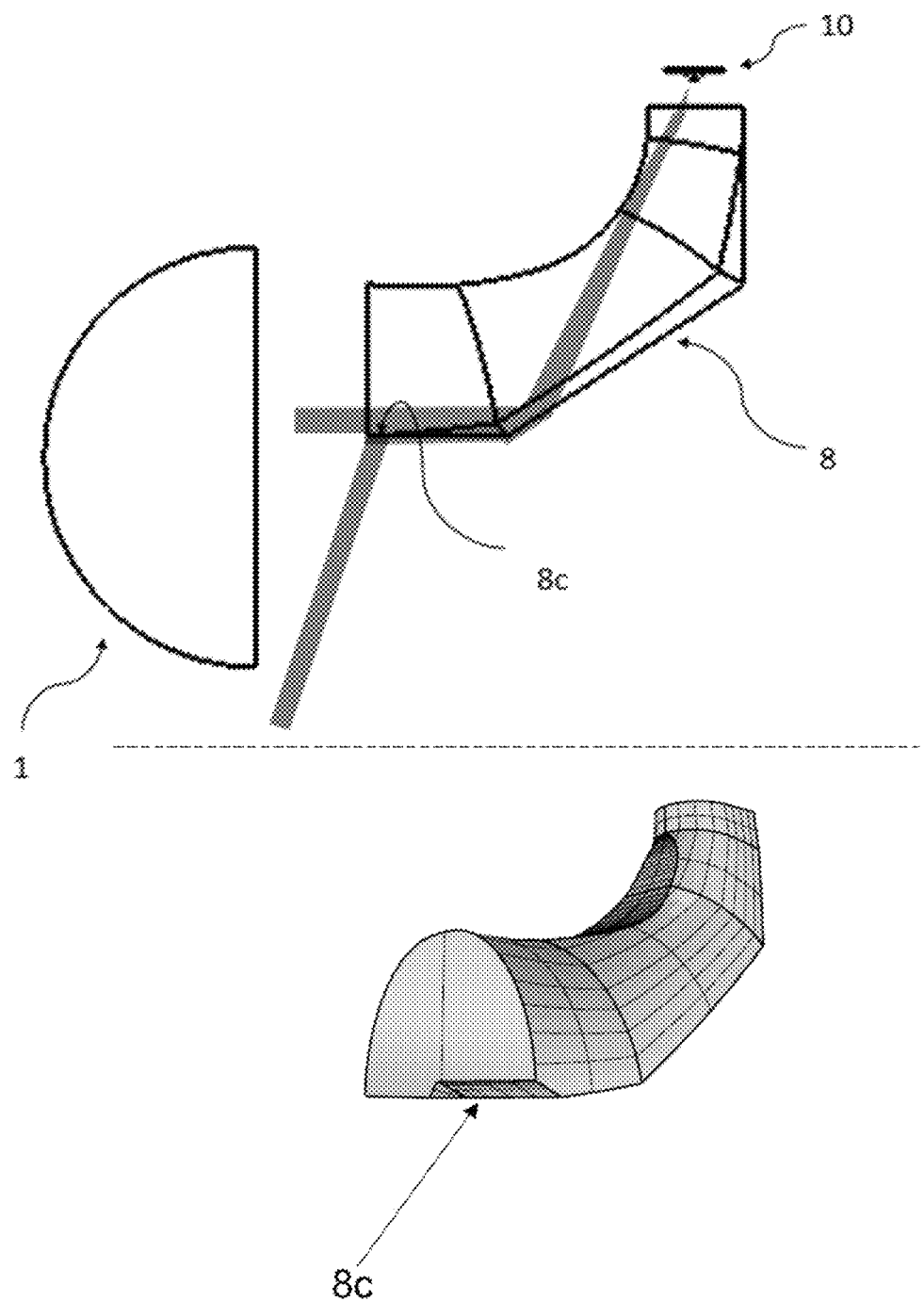
FIG. 3 is substantially a front view of the lightguide with a sample ray path along the cut-off mechanism.

The cut-off mechanism 8c of the lightguide 8 is depicted in FIG. 3. The cut-off mechanism 8c is characterized by a facet on the bottom of the exit face 8b. The exit face is comprised of such a facet which is oriented at an angle with respect to the exit face larger than 90 degrees. The cut-off mechanism is configured in such a way that it directs some portion of light away from optical axis B.

Figure 4:
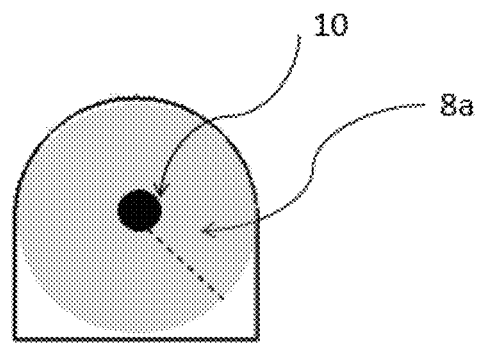
FIG. 4 is substantially a top view of the lightguide depicting the entrance face.

FIG. 4. shows a top-view of the entrance face 8a of the lightguide 8. The diameter of the entrance face 8a of the lightguide 8 is determined by the intended amount of light to be captured from the light emitting source 10. The two-dimensional geometry of the entrance face 8a of the lightguide 8 is preferably comprised of a substantially curved configuration; however, the entrance face 8a may be comprised of various other configurations such as but not limited to rectangular or elliptical.

Figure 5:
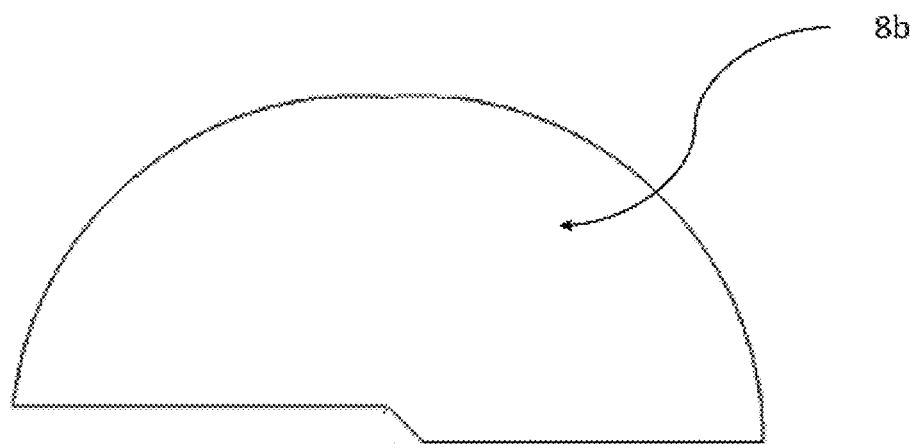
FIG. 5 is substantially a view of the lightguide depicting the exit face with the sample cutoff outlined in preferred embodiments.

The exit face 8b of the lightguide 8 is depicted in FIG. 5. The exit face 8b of the lightguide 8 is substantially configured to form substantial boundaries of illumination pattern. As an example, in FIG. 5, an inverted low beam pattern in compliance to boundaries of ECE Regulation 112 is used for the shape of the exit face. A person having ordinary skill in the art would understand that upon coupling to projection optics, the illumination pattern flips upside-down while being projected onto a wall or in the far-field. The two dimensional geometry of the exit face 8b is preferably comprised of a substantially circular configuration connected to linear segments, however other configurations may be utilized based on the regulation used, and the example here should not be considered limiting. Horizontal spread is determined by the profile of the exit face 8b. Other configurations of the exit face may be determined by government regulations for different types of low beam or high beam patterns.

The angle of the reflection surfaces 8e in the characteristic bend 8d are preferably determined by the construction material and spectral power density of the light source to create total internal reflection. In a preferable configuration of the lightguide 8, total internal reflection on the reflection faces 8e is the only reflection mechanism used, however reflective coatings may be utilized on the outside surfaces to increases efficiency. The reflection faces 8e of the characteristic bend 8d are substantially planar.

C. Light Emitting Source

In one embodiment of the present disclosure, the light emitting source 10 is positioned substantially perpendicular to optical axis B in FIG. 2. The light emitting source 10 is preferably attached to a heatsink 12, however other configurations may be utilized.

The light emitting device may further comprise of electrical elements to provide power or other electrical based functions. It can contain optical devices to spread the light distribution such as but not limited to substrates, prisms, reflectors, light transmitting materials, light redirecting elements, scattering elements and other elements.

The light emitting source may be secured with housing elements 15, and other assembly components such as screws, clips, connectors, and protective elements.

D. Projection Optics

The projection optics 1 is preferably positioned along optical axis B. The primary objective of the projection optics is to reorient the light rays from exit face 8b of the lightguide 8 and collimate them into the far field for road illumination. The preferred method of projection is to orient the projection optics about one focal length away from the exit face 8b of the lightguide 8.

In on embodiment of the present disclosure, the projection optics 1 may be secured by the housing 7 and retaining elements 2, 3, 4 as shown in FIG. 1, and other assembly components such as screws, clips, connectors, and protective elements.

In a preferred configuration, the projection optics consists of one planar side, and a substantially aspherical side, however other configurations may be used such as Fresnel lenses.

Example I

In one embodiment of the disclosure, the lightguide 8 is configured produce an output illumination pattern to conform to regulatory specification issued for automotive lighting, i.e. ECE Regulation 112 for low beam headlamps. The regulation consists of test points at specific coordinates that have a minimum or maximum set luminous intensity measured in unit of candelas (cd).

Figure 6:
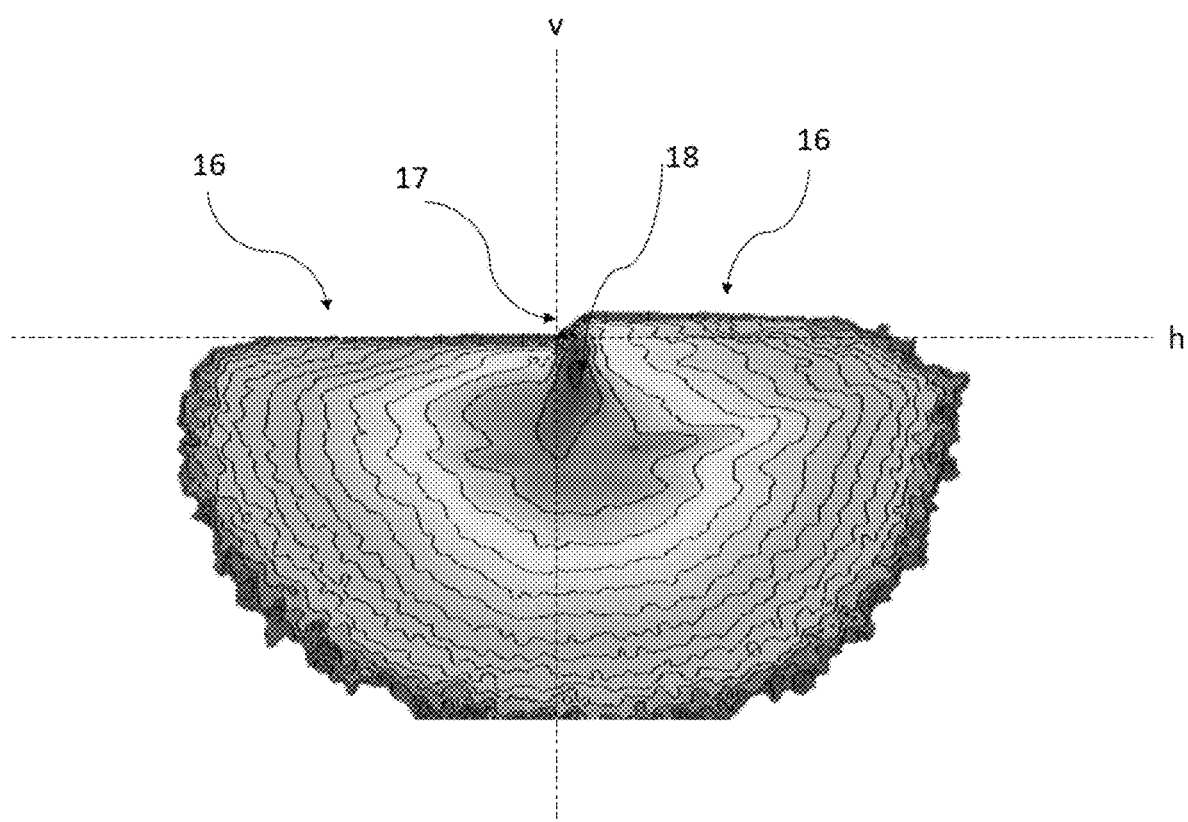
FIG. 6 is substantially an illumination plot, or wall plot, in the far field of Example 1.

FIG. 6 shows several defining features of the ECE regulation 112. In this example illumination pattern, a sharp cutoff is present as indicated by two horizontal lines 16 connected by a 45 degree incline 17. Shown also in FIG. 6 is the pattern and intensity distribution of light rays in the far field that comply with ECE Regulation 112. The cut-off mechanism 8c of the lightguide 8 helps with creation of sharp horizontal lines 16 that make up the cutoff pattern of ECE Regulation 112. In this embodiment, the cut-off is sharp and without significant aberration. The hotspot 18 is the highest intensity of light that is directed substantially along axis B to illuminate the side of the road directly in front of the driver. The location of the hotspot 18 may be determined in this configuration by the position of the source in relation to the entrance face 8a of the lightguide 8 and the shape of the characteristic bend of the lightguide 8.

In this embodiment, the lightguide 8 is configured with respect to a 3-inch diameter projection lens 1 and a high power white light emitting diode (LED) 10. In comparison to other light sources currently available, an LED is significantly compact and offers extended life span. The luminous output of such LEDs is in the range of 800 to 1400 lumens, and the entrance face 8a captures most of the light emitted from the LED. The dimensions of the lightguide 8 in this example is confined within a 60×60×60 mm box. The size of lightguide set forth here should not be considered limiting. That is, the dimensions may be scaled down or up for performance adjustments.

The aforementioned was one example of the lightguide headlamp. A person having ordinary skill in the art may infer other modified version of the current disclosure in order to meet the specifications set forth in other regulations for low beam or high beam or both. Although the description above contains many specifications, these should not be construed as limiting the scope of the disclosure but as merely providing illustrations of some of embodiments of this disclosure. Thus, the scope of the disclosure should be determined by the appended claims and their legal equivalents rather than by the example given.

What is claimed is:

1. A headlamp comprising: a light source; and, a light guide having an elongated asymmetrical shape, the lightguide comprised of an entrance face coupled optically to the light source, a body having a characteristic bend extended from the entrance face to an exit face, the exit face having a horizontal facet on its lower periphery as a cut-off mechanism, a projection optics physically separated but optically coupled to the exit face; wherein the lightguide is configured to re-orient light rays entering the entrance face at a first axis to exit from the exit face at a different-angled second axis using reflections by internal reflection surfaces oriented along the characteristic bend, and wherein the lightguide is further configured to form an illumination pattern having a horizontal cut-off by the exit face and the cut-off mechanism.

2. The headlamp of claim 1, wherein said light source is a light emitting diode.

3. The headlamp of claim 1, wherein said light source is oriented substantially perpendicular to the second axis.

4. The headlamp of claim 1, wherein said lightguide is fabricated from clear, solid plastics.

5. The headlamp of claim 1, wherein said entrance face is oriented substantially perpendicular to the optical axis.

6. The headlamp of claim 1, wherein the entrance face is comprised of a curved surface.

7. The headlamp of claim 1, wherein the internal reflection surfaces are substantially planar.

8. The headlamp of claim 1, wherein the internal reflection surfaces of the characteristic bend create a hotspot in the illumination pattern.

9. The headlamp of claim 1, wherein said facet oriented backward and toward the characteristic bend at an angle larger than 30 degrees, the facet is configured to redirect a portion of light away from the illumination pattern.

10. The headlamp of claim 1, wherein said projection optics is a lens.

* * * * *

UNITED STATES PATENT AND TRADEMARK OFFICE
CERTIFICATE OF CORRECTION

| | | |
|---|---|---|
| PATENT NO. | : 10,753,562 B1 | Page 1 of 1 |
| APPLICATION NO. | : 16/435535 | |
| DATED | : August 25, 2020 | |
| INVENTOR(S) | : Hossein Alisafaee and Audrey C. Brand | |

It is certified that error appears in the above-identified patent and that said Letters Patent is hereby corrected as shown below:

On the Title Page

Item (72) should be Hossein Alisafaee and Audrey C. Brand.

Signed and Sealed this
Twenty-second Day of December, 2020

Andrei Iancu
*Director of the United States Patent and Trademark Office*